US006041816A

United States Patent [19]

Hiramatsu et al.

[11] Patent Number: 6,041,816

[45] Date of Patent: Mar. 28, 2000

[54] TERMINAL BOX FOR MANIFOLD-MOUNTED SOLENOID-OPERATED VALVE

[75] Inventors: Kazuo Hiramatsu; Makoto Ishikawa, both of Ibaraki, Japan

[73] Assignee: SMC Corporation, Tokyo, Japan

[21] Appl. No.: 09/205,362

[22] Filed: Dec. 4, 1998

[30] Foreign Application Priority Data

Dec. 26, 1997 [JP] Japan .................................... 9-368074

[51] Int. Cl.[7] .................................................. F16K 31/02

[52] U.S. Cl. .......................... 137/560; 137/271; 137/884

[58] Field of Search .................................... 137/560, 884, 137/271

[56] References Cited

U.S. PATENT DOCUMENTS

| | | | |
|---|---|---|---|
| 5,333,647 | 8/1994 | Fukano et al. | 137/884 |
| 5,664,604 | 9/1997 | Sato et al. | 137/884 |
| 5,915,666 | 6/1999 | Hayashi et al. | 137/884 X |
| 5,918,629 | 7/1999 | Hayashi et al. | 137/560 |

FOREIGN PATENT DOCUMENTS

| | | |
|---|---|---|
| 0 692 638 | 1/1996 | European Pat. Off. . |
| 0 732 769 | 9/1996 | European Pat. Off. . |
| 6-38227 | 5/1994 | Japan . |
| 2 131 631 | 6/1984 | United Kingdom . |

*Primary Examiner*—John Rivell
*Attorney, Agent, or Firm*—Oblon, Spivak, McClelland, Maier & Neustadt, P.C.

[57] ABSTRACT

The present invention provides a terminal box that enables wirings for solenoid-operated valves mounted on manifolds to be achieved simply and safely without causing leads to be entangled or causing an open circuit. In a terminal box body 4 consisting of a box-shaped housing 6 and a cover 7 that can be mounted to or detached from the front surface of the housing, a terminal block 5 is accommodated so as to move forward and backward. The lower end of the cover 7 is connected to the terminal block 5 using connection shafts 29 in such a way that the cover 7 can rotate. When the cover 7 is opened by being brought down forward, the connection shafts 29 are used as supporting points, and the terminal block 5 can be moved into and out from the housing using the open cover 7.

10 Claims, 11 Drawing Sheets

TERMINAL BOX FOR MANIFOLD-MOUNTED SOLENOID-OPERATED VALVE

FIELD OF THE INVENTION

The present invention relates to a terminal box used for wiring for a solenoid-operated valve mounted on a manifold.

PRIOR ART

In solenoid-operated valves each mounted on the valve installation surface of each of a plurality of separate manifold blocks separated for each solenoid-operated valve, a terminal box is normally provided at one longitudinal end of each manifold block and each solenoid-operated valve is wired through this terminal box.

A wiring connection apparatus for such manifold-mounted solenoid-operated valves is disclosed in, for example, Japanese Utility Model Laid Open No. 6-38227, wherein a cover that can be opened when brought down outward is provided at the opening of a terminal box mounted on a manifold in such a way that the terminal block is mounted on the rear surface of the cover.

In this proposed connection apparatus, when the cover is brought down, the terminal block on the rear surface of the cover is exposed outward, so connection operations can be performed outside the terminal box.

In this apparatus, however, the terminal block is directly mounted on the rear surface of the cover, so when the cover is brought down, the entire terminal block is entirely drawn out from the terminal box, and the distance the terminal block is drawn out is unnecessarily long. Thus, if the cover is opened with leads connected to the terminal block, the length over which the leads are drawn out is also large, and the leads are subjected to an excessive force, leading to a possible open-circuit accident. Besides, the orientation in which the terminal block is housed in the terminal box differs by 90° from the orientation in which it is drawn out therefrom, and the height of the terminal block also differs distinctly between these two states. Consequently, when the terminal block is drawn in and out simultaneously with the opening and closing of the cover, the leads may be deformed or displaced severely, and may even become entangled, causing an open circuit.

In addition, if low small manifold blocks are used, correspondingly small terminal boxes are used. The height of covers for the terminal boxes, however, cannot be reduced significantly due to the restrictions on terminal blocks, making the miniaturization of terminal boxes difficult. The use of small terminal blocks prevents leads from being connected easily.

Moreover, since the cover is directly connected to the terminal box body using support shafts, if the support shafts are damaged to release the cover, the terminal block is displaced together with the cover and may damage the leads connected to the terminal block.

In addition, if solenoid-operated valves are used in a very humid operating environment or an operating environment in which the valves may become wet, the connections of the wiring are preferably sealed to prevent leakage or short circuits caused by humidity.

DISCLOSURE OF THE INVENTION

It is a main object of this invention to provide a terminal box that enables wiring connection operations for solenoid-operated valves mounted on manifolds to be performed simply and safely without causing leads to be entangled or causing an open circuit.

It is a dependent object of this invention to provide the terminal box with a high sealing capability to reliably prevent leakage or short circuits caused by moisture.

To achieve these objects, this invention provides a terminal box wherein a terminal block is housed in a terminal box body so as to move into and out from the body along a rail, the terminal box body consisting of a box-shaped housing and a cover detachably mounted on the front surface of the housing. The lower end of the cover is rotatably connected to the terminal block using connection shafts in order to allow the cover to be opened when it is brought down outward using the connection shafts as supporting points, while allowing the terminal block to be drawn out from or pushed into the housing using the open cover.

According to the terminal box of this invention having this configuration, leads are connected to the terminal block outside the terminal box by bringing the cover down forward to open it and drawing the terminal block out from the housing along a rail using the cover. Once the connections have been made, the terminal block is pushed into the housing through the cover, and the cover is raised up to close the front surface of the housing.

According to the terminal box of this invention, the terminal block is moved into and out from the housing along the rail. As a result, these operations are simple and the terminal block can be drawn out over the exact length required depending on the surrounding area. Moreover, the terminal block can be moved in and out using the open cover, the operation is simple and does not require direct contact with the terminal block, and thus electric shocks are prevented. In a word, this terminal box is very safe.

In addition, in contrast to the conventional example in which the terminal block is mounted on the rear surface of the cover, the orientation or height of the terminal block is not noticeably changed when the terminal block is moved in and out. Consequently, connected leads are not subjected to excessive forces, deformations, or offsets, so they are unlikely to become entangled or cause an open circuit.

Furthermore, the terminal block does not restrict the height of the cover, so the terminal box can be miniaturized freely.

According to this invention, the rail is formed on the bottom surface of the housing, and a rail groove is formed on the bottom surface of the terminal block in which the rail is fitted.

This invention preferably includes a stopper mechanism consisting of hooks and hook receivers formed on the housing and the terminal block, respectively, in order to define the maximum draw-out position of the terminal block.

According to one specific embodiment, the hooks are formed on both sides of the terminal block and the hook receivers are formed inside the housing.

According to another specific embodiment, the hooks and the hook receivers are formed at the tip of the rail formed in the housing and at the rear end of the rail groove formed in the terminal block.

In this invention, a guide mechanism is desirably provided in the housing and the terminal block to lower the terminal block in response to the draw-out operation in such a way that the terminal block abuts the installation surface of a manifold block at a point where it has been drawn out from the housing.

This configuration prevents the terminal block from assuming an inclined or other unstable position. Thus, when a tool such as a driver is used to connect leads to the terminal block, the operation can be easily performed while a force acting on the terminal block is being reliably supported. This configuration also reliably prevents damage to the terminal block that is likely to occur when a strong force is applied to tighten the screw while the terminal block assumes an unstable position.

According to a specific example of this invention, the guide mechanism consists of an inclined wall formed at the tip of the rail. The wall is inclined forward and downward so that the terminal block is lowered along the inclined wall when drawn out forward along the rail.

In this case, the hooks constituting the stopper mechanism are preferably formed at the tip of the rail while the hook receivers are formed at the rear end of the terminal block. In this way, the hooks and the hook receivers are engaged together when the terminal block has been lowered.

According to a preferred embodiment of this invention, the terminal box has a feeding connector that is connected to a receiving connector provided on the solenoid-operated valve, and the receiving lead is connected between the feeding connector and the terminal block beforehand.

According to this invention, preferably, a waterproof seal member is interposed between the cover and the housing, and a seal member is provided on both sides of the housing to keep adjacent terminal boxes waterproof when a plurality of terminal boxes are jointed together.

DETAILED DESCRIPTION

Figure 1:
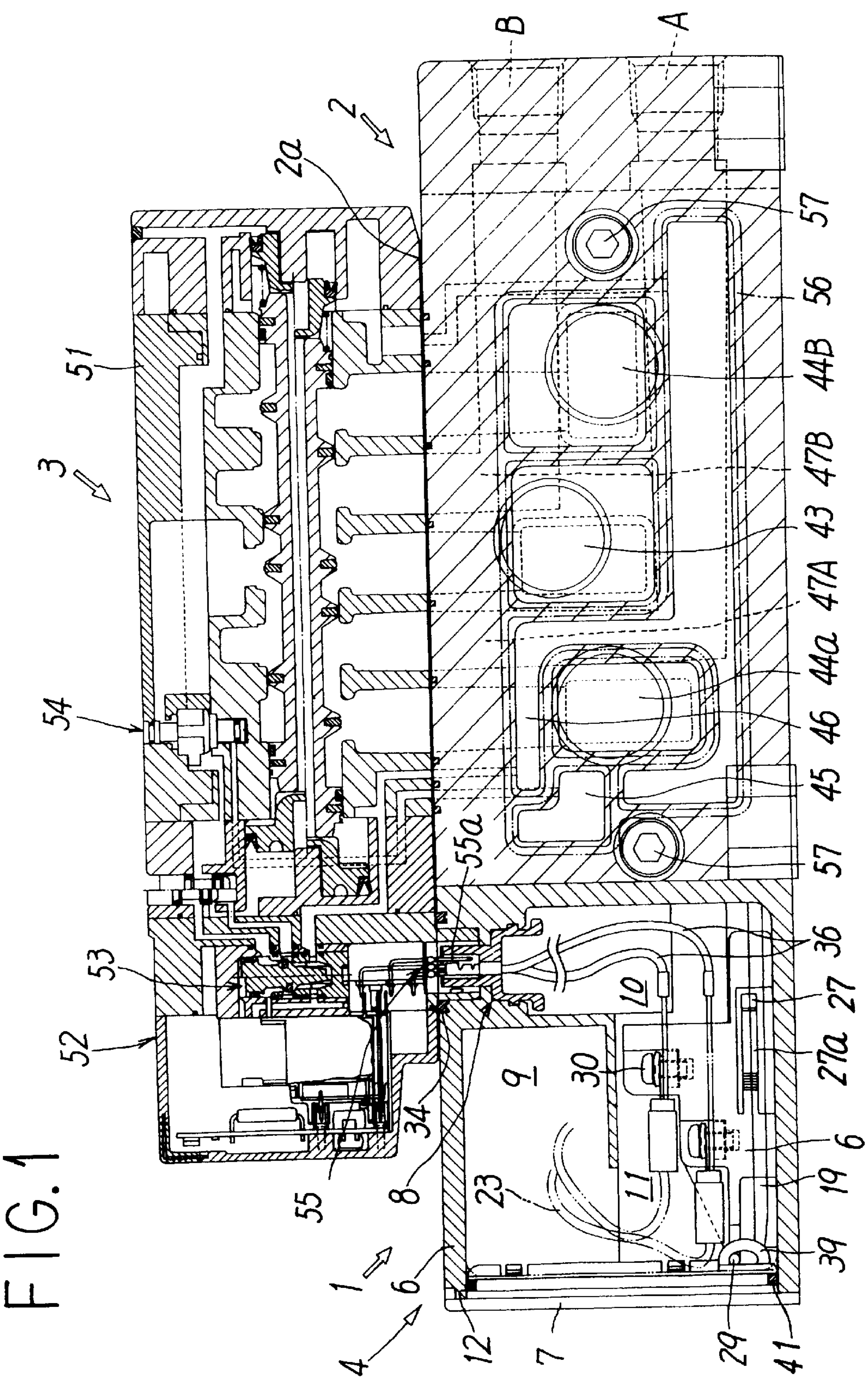
FIG. 1 is a sectional view showing a terminal box according to the first embodiment of this invention mounted on a manifold block.
Figure 2:
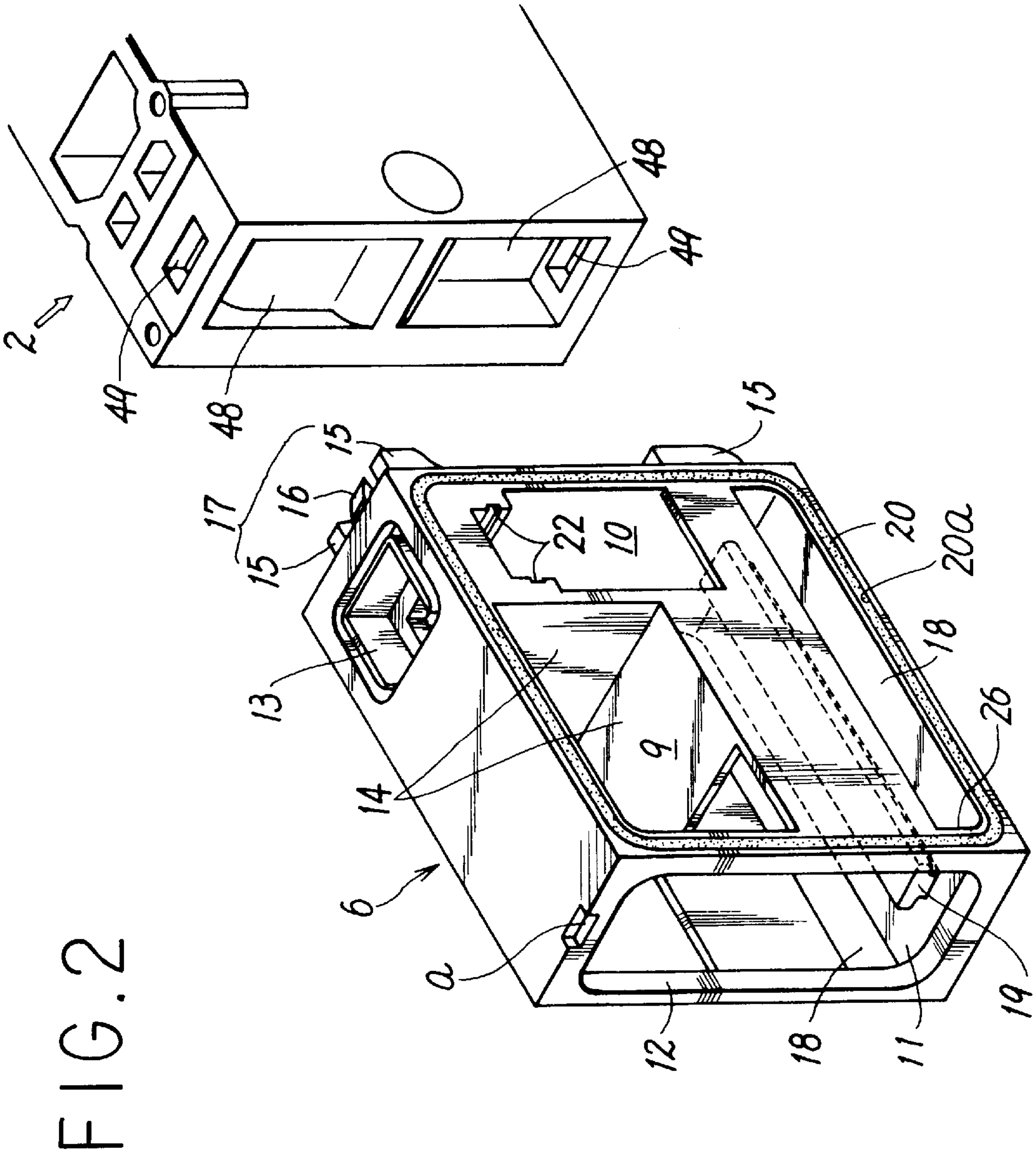
FIG. 2 is a perspective view showing the manifold block from which the housing has been removed.
Figure 3:
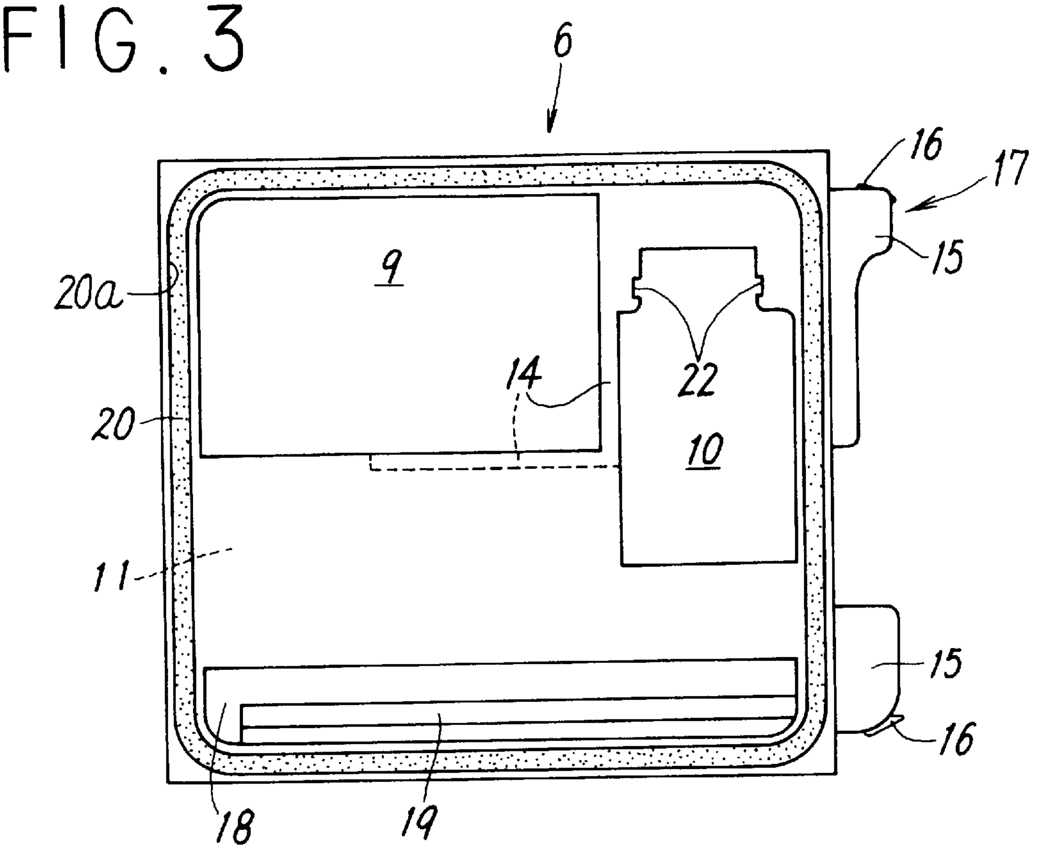
FIG. 3 is a side view of the housing.
Figure 4:
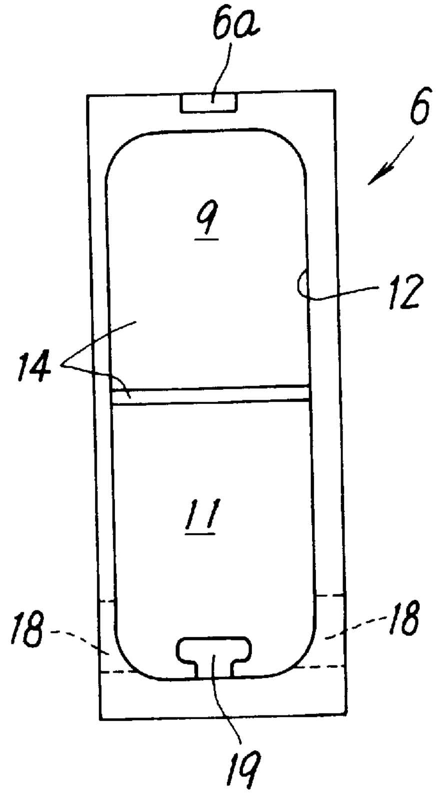
FIG. 4 is a front view of the housing.
Figure 5:
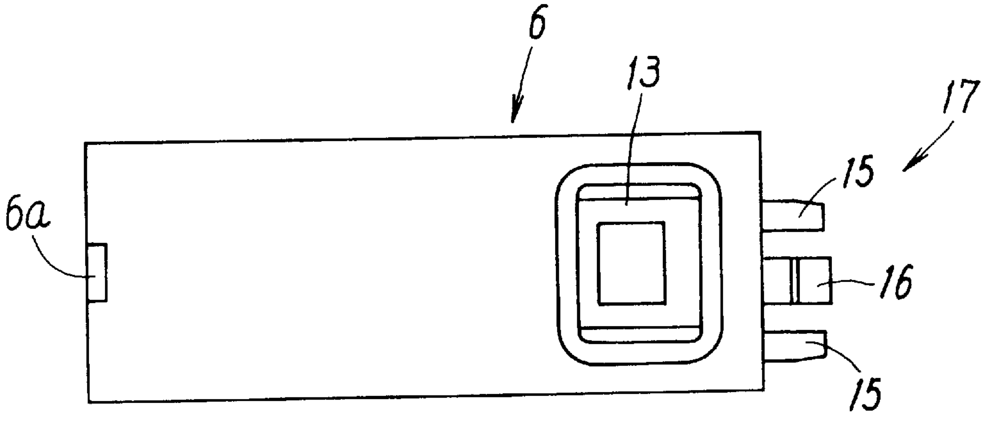
FIG. 5 is a top view of the housing.

FIG. 1 shows a terminal box according to the first embodiment mounted on a manifold block 2. In this figure, 1 denotes a terminal box, 2 denotes a split-type manifold block, and 3 denotes a solenoid-operated valve mounted on the valve loading surface 2*a* of the manifold block 2. A plurality of manifold blocks 2 are joined and connected together laterally for operation, and adjacent terminal boxes 1 are then jointed together. Wiring is provided to the solenoid-operated valve 3 through the terminal block 1 mounted on each manifold block 2.

The terminal box 1 includes a terminal box body 4 that is mounted on the manifold block 2 and a terminal block 5 housed in the terminal box body 4.

Figure 6:
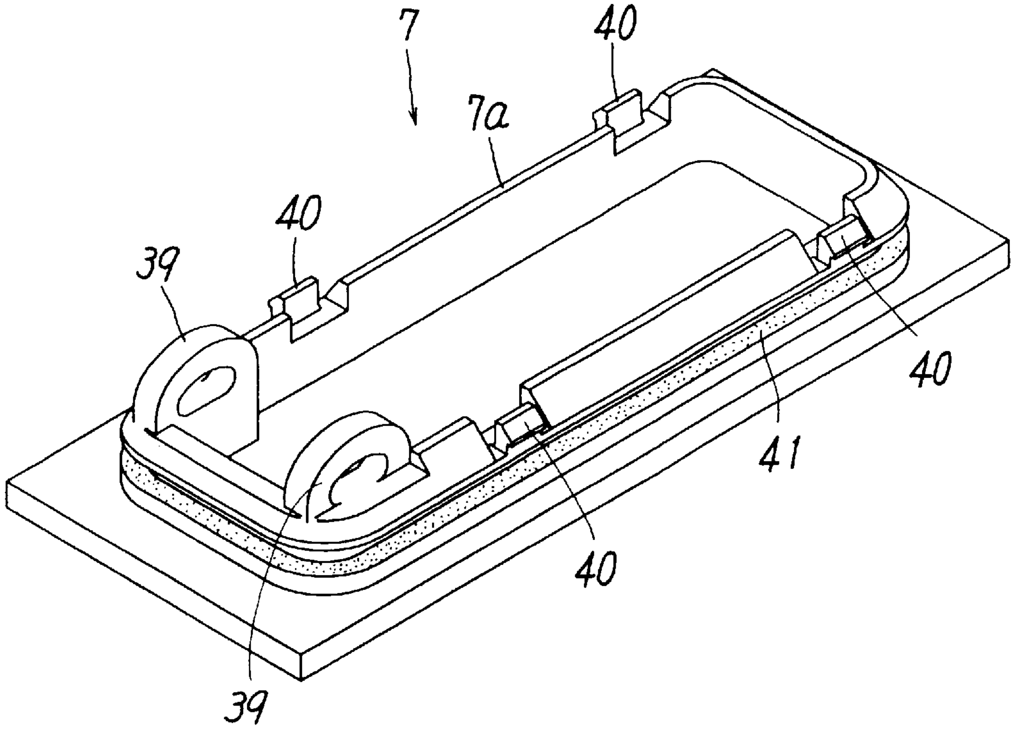
FIG. 6 is a perspective view of the cover.

The terminal box body 4 consists of a housing 6 shaped like a rectangular box as shown in detail in FIGS. 2 to 5 and a cover 7 as shown in FIG. 6 detachably mounted on an opening 12 in the front surface of the housing 6.

The housing 6 has almost the same horizontal width as the manifold block 2, and a feeding-line accommodation chamber 9 into which a feeding lead from an external power source through the adjacent terminal box 1 is formed in the upper front of the housing 6. The accommodation chamber 9 opens onto both sides of the housing 6 to allow a lead 23 to be fed to another terminal box. In addition, in the upper rear of the housing 6, a receiving line accommodation chamber 10 in which the receiving lead 36 leading to the solenoid-operated valve 3 is accommodated is formed in such a way as to open onto one or both of the sides of the housing 6, and a connector accommodation chamber 13 in which a connector 8 with the receiving lead 36 connected thereto is accommodated is formed in such a way as to open onto the top surface of the housing 6, which is in communication with the accommodation chamber 10. Furthermore, at the lower end of the housing 6, a terminal block accommodation chamber 11 in which the terminal block 5 is accommodated is formed in such a way as to communicate with the accommodation chambers 9 and 10 and with the opening 12 in the front surface of the housing 6.

Between the feeding line and receiving line accommodation chambers 9 and 10 and between the feeding line and terminal block accommodation chambers 9 and 11, partition walls 14 are formed to partition these accommodation chambers. The accommodation chambers can be partitioned by the partition walls 14 to separate the feeding and receiving leads 23 and 36, thereby preventing the leads from becoming mixed up. The partition walls 14, however, may be omitted.

A mounting means 17 that can be attached to or detached from the manifold block 2 is formed on the rear end surface of the housing 6. The mounting means 17 is formed of a plurality of (in the illustrated example, four) positioning protrusions 15 that are fitted in a recessed portion 48 of one of the end surfaces of the manifold block 2; and two locking claws 16 that, from the inside of the recessed portion 48, elastically engage engaging and locking grooves 49 provided in the top and bottom surfaces of the manifold block 2.

In addition, the terminal block accommodation chamber 11 opens onto both sides of the housing 6 through a groove-shaped opening 18, and a rail 19 on which the terminal block can be placed and moved is formed in the middle of the bottom wall of the accommodation chamber 11 in such a way that one longitudinal side of the rail is longer than the other side.

A seal groove 20*a* is formed along one or both of the outer sides of the housing 6 in such a way as to encompass all the circumference of the outer side, and a seal member 20 is fitted in the seal groove in one of the sides to provide a seal between this housing 6 and the housing 6 of the adjacent terminal block 1. A recessed portion 6*a* into which an appropriate tool is inserted to force the cover 7 open is formed between the top and front surfaces of the housing 6, and connector mounting grooves 22 in which the feeding connector 6 is mounted are formed in the receiving line accommodation chamber 10 and opposite to each other. As seen in FIG. 6, the cross section of the cover 7 has almost the same shape and size as that of the housing 6, and an insertion section 7*a* shaped like a rectangular frame that is fitted in the opening 12 of the housing 6 is formed on its inner surface. The cover 7 can be mounted in the housing 6 by fitting the insertion section 7*a* in the opening 12. A plurality of engagingly locking claws 40 that elastically engagingly lock in the edge of the opening 12 are provided in part of the insertion section 7*a* to maintain a mounting state. In addition, a seal member 41 is mounted on the outer circumferential surface of the insertion section 7*a* so that the insertion section can be mounted in the opening 12 in a waterproof manner, using the seal member.

The force applied by the engagingly locking claws 40 to engage the edge of the opening does not need to be very strong but is sufficient as long as a tool such as a driver can be inserted into the recessed portion 6*a* to force it open to release the engaging lock so that the cover 7 can be opened.

The terminal block 5 accommodated in the terminal box 1 has a plurality of screw terminals 30 located in two vertical stages. A bar-like conductor 32 is attached to the terminal 30 in such a way that its tip extends backward, and the receiving lead 36 that is connected to the solenoid-operated valve 3 via the feeding connector 8 is connected to the conductor 32 by means of soldering or crimping. In the figure, 37 is an insulating tube that covers connections. The feeding lead 23 (see FIG. 1) leading to an external power source is connected to each of the terminals 30 to connect the solenoid-operated valve 3 to the external source.

A guide groove 25 extending in the longitudinal direction is provided in the middle of the bottom surface of the terminal block 5, and the rail 19 is fitted in the guide groove 25 so that the terminal block 5 can be moved along the rail 19 in the longitudinal direction. Thus, the rail 19 and the guide groove 25 constitute a guide means for movably guiding the terminal block 5.

Elastic arms 27*a* extending rearward are formed on the respective horizontal-axis-wise sides of the terminal block 5, and hooks 27 are formed at the tip of the elastic arm 27*a*. When the terminal block 5 is drawn out forward from the housing over the maximum distance, the hooks engagingly lock in hook receivers 26 consisting of the edges of the opening 12 to engagingly lock the terminal block at that position. Accordingly, the hooks 27 and the hook receivers 26 constitute a stopper mechanism for defining the maximum draw-out position of the terminal block 5.

To pull the terminal block 5 out from the housing 6, the elastic arm 27*a* may be deformed inward so that the hook 27 is not caught on the hook receiver 26 before the terminal block 5 is pulled out.

The terminal block 5 is connected to the cover 7 so that the cover can be used to move the terminal block in and out. That is, connection shafts 29 are formed on the respective sides at the tip of the terminal block 5, whereas engagingly locking rings 39 each including a long hole in which the connection shaft 29 is loosely fitted are formed at the lower end of the cover 7. The connection shafts 29 and the engagingly locking rings 39 are engaged together to connect the lower end of the cover 7 to the tip of the terminal block 5 so that the cover can be moved while it is inclined. The cover 7 can thus be opened while inclined forward using the connection shafts as supporting points, and the terminal block 5 can be pulled out from and pushed into the housing 6 using the open cover 7.

Figure 7:
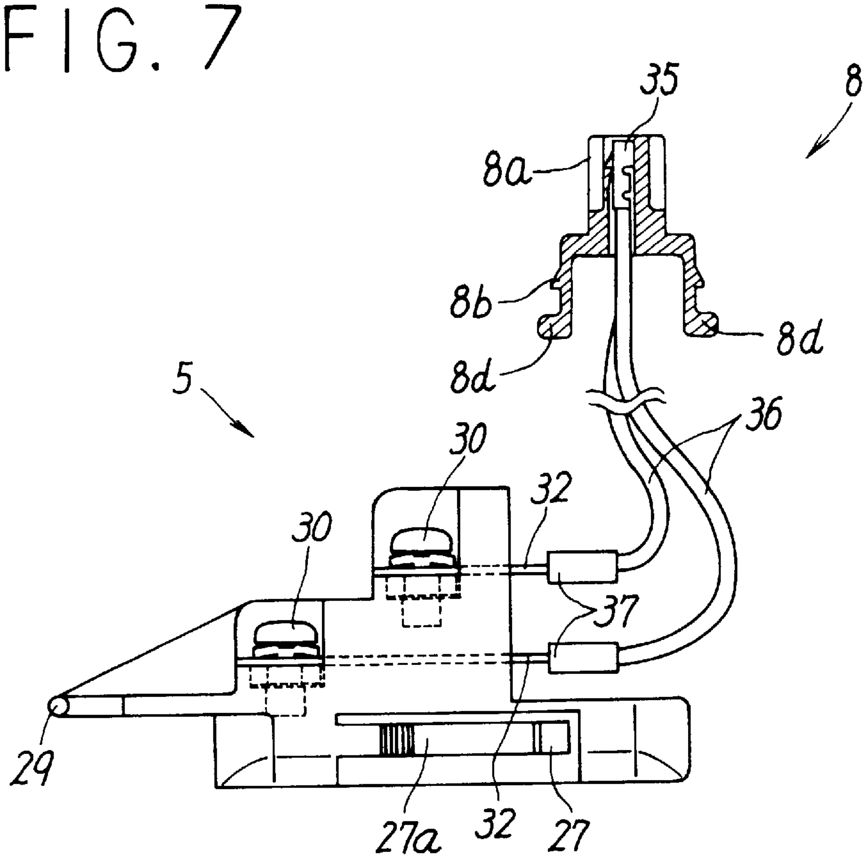
FIG. 7 is a side view of a terminal block to which a receiving lead is attached.
Figure 8:
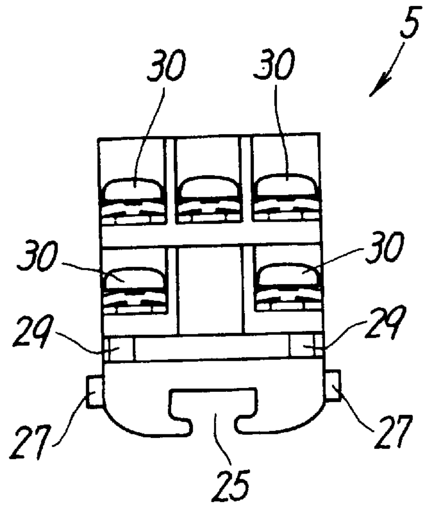
FIG. 8 is a front view of the terminal block.
Figure 9:
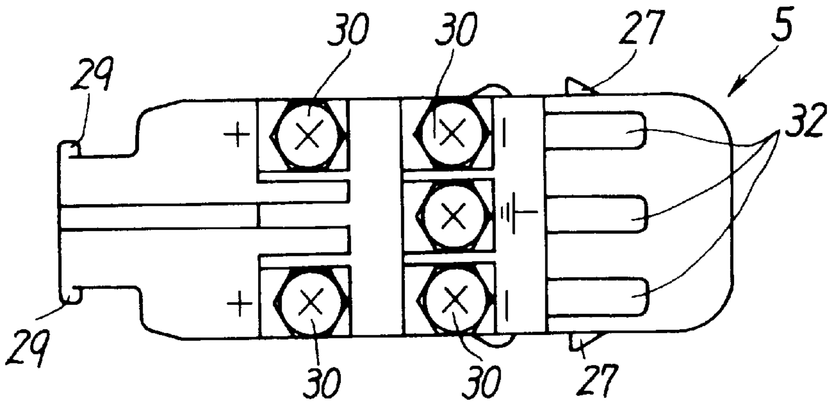
FIG. 9 is a top view of the terminal block.
Figure 10:
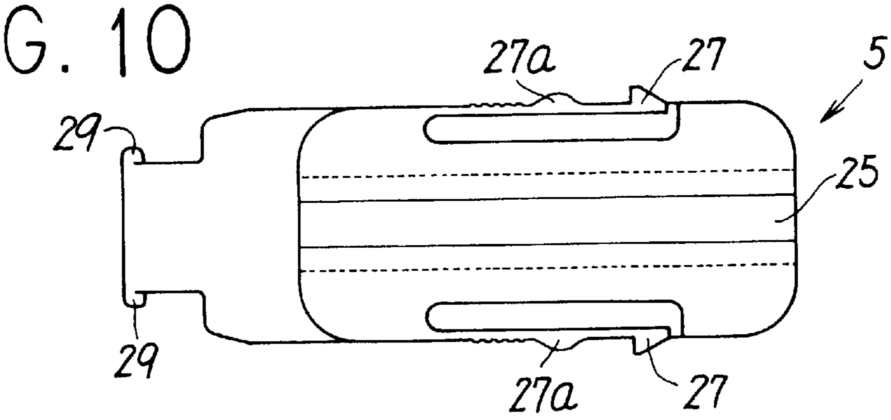
FIG. 10 shows the underside of the terminal block.
Figure 11:
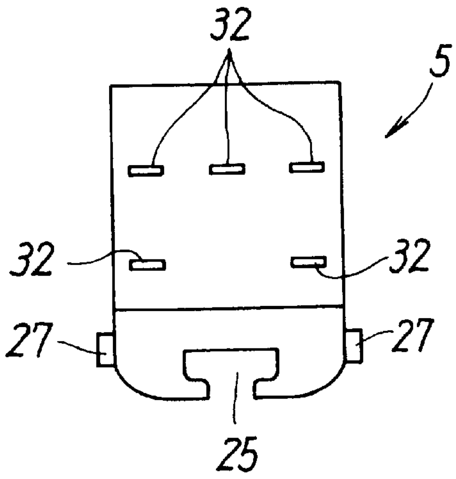
FIG. 11 is a rear view of the terminal block.

As seen in FIGS. 1 and 7, the feeding connector 8 has a protrusion 8*a* at the upper end that is inserted into the opening of the connector accommodation chamber 13, a groove-like base 8*d* below the protrusion, and an engagingly locking portion 8*b* formed on the outer surface of the base 8*d*. By pressing the base 8*d* from both sides to elastically narrow its width while inserting the base into the connector accommodation chamber 13 from the terminal block or receiving line accommodation chamber 11 or 10 side, the connector is mounted in the connector accommodation chamber 13 while the engagingly locking section 8*b* is engagingly locked in the connector mounting groove 22. To remove the feeding connector 8 from the connector accommodation chamber 13, the same operation is performed in the reverse order.

When the feeding connector 8 is mounted in the connector accommodation chamber 13, the top surface of the protrusion 8*a* is almost flush with the top surface of the housing 6. When the solenoid-operated valve 3 is mounted on the manifold block 2, pin-shaped receiving terminals 55*a* provided in a receiving connector 55 in the solenoid-operated valve 3 are each engaged with a feeding terminal 35 at the end of each lead 36 for automatic connection. A seal member 34 surrounding the protrusion 8*a* is mounted around the opening of the accommodation chamber 13.

As seen in FIG. 1, the manifold block 2 includes a supply channel 43 for a pressurized fluid penetrating the block in the direction in which the blocks 2 are connected, two ejection channels 44A and 44B, an external pilot supply channel 45, and a pilot ejection channel 46. The channels 43 to 46 are individually open toward a valve installation surface 2*a* of the manifold block 2.

One end of each of the output passages 47A and 47B for the pressurized fluid is open between the openings of the supply channel 43 on the valve installation surface and the ejection channels 44A and 44B, respectively. The other ends of these output passages 47A and 47B are in communication with output ports A and B on the rear surface of the manifold block 2.

In the illustrated example, the solenoid valve 3 installed on the valve installation surface 2*a* of the manifold block 2 is a pilot-operated five-port directional control valve comprising a main valve 51, a solenoid-driven pilot valve 52, and an amplifying valve 53 between these valves. A switching member 54 is also included to switch the method for supplying a pilot fluid to the pilot valve 52, and the mounting position of the switching member 54 is inverted by 180° in the axial direction to switch between the illustrated internal pilot method, in which pilot fluid is supplied through the supply channel 43, and an external pilot method, in which pilot fluid is supplied through the external pilot supply channel 45.

When the solenoid valve 3 is installed on the valve installation surface 2*a* of the manifold block 2 via a gasket, each port communicates with the opening of the corresponding channel in the manifold block 2 in an airtight manner, and the receiving terminals 55*a* of the receiving connector 55 are inserted into the feeding connectors 35 of the feeding connector 8 mounted in the housing.

The solenoid-operated valve 3 according to this invention, however, is not limited to the illustrated directional control valve, as this invention may use a direct-operated directional control valve in which a valve disc is directly driven by a solenoid. In addition, this invention is not limited to the use of directional control valves, but may employ a valve in which power is supplied to the solenoid through plug-in type receiving terminals 55.

Figure 12:
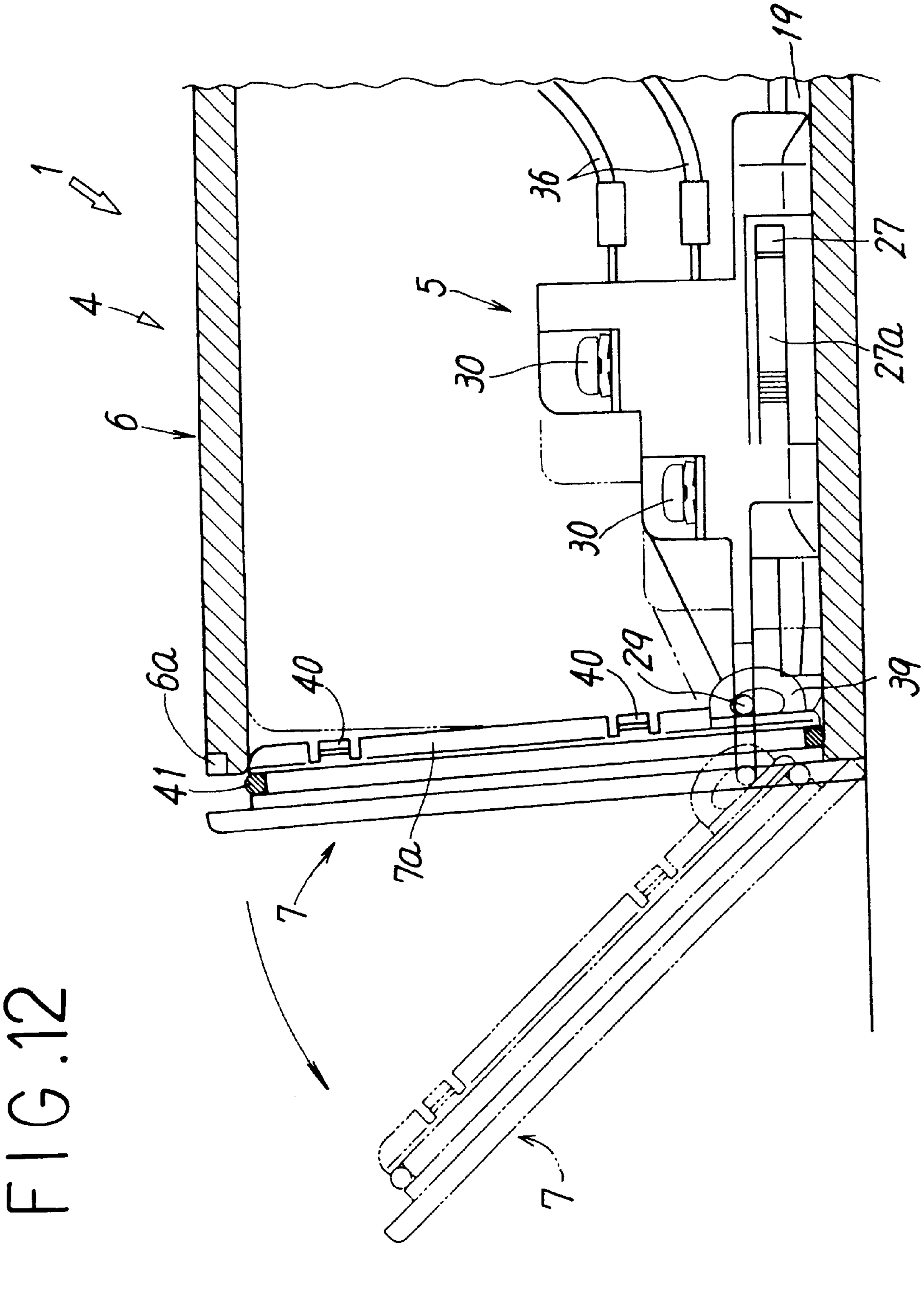
FIG. 12 is a sectional view of part of terminal box showing how the cover is opened.
Figure 13:
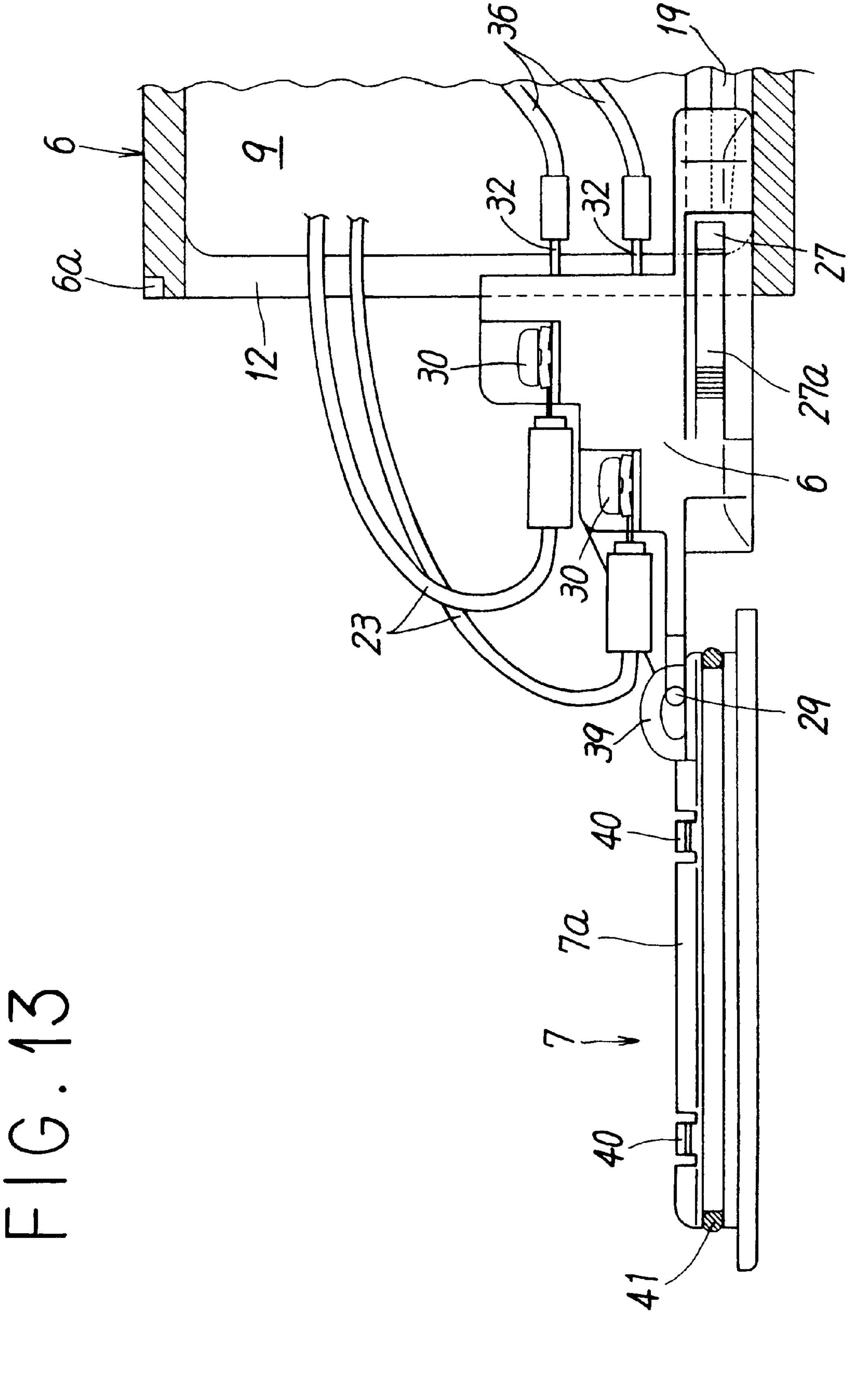
FIG. 13 is a sectional view of part of the terminal box showing the state in which the cover is open and in which the terminal block has been drawn out.

In this embodiment, to wire the solenoid valve 3, the cover 7 on the front surface of the terminal box 1 is brought down forward using, as supporting points, the connection shafts 29 at the tip of the terminal block 5, as shown in FIG. 12. The cover 7 is used to move the terminal block 5 forward from the housing 6 along the rail 19. Furthermore, the feeding leads 23 in the feeding line accommodation chamber 9 are drawn out and connected to the terminal block 5. Thus, the leads 23 can be connected to the terminal block 5 using a wide area outside the terminal box 1. In this case, if the receiving leads 36 are not connected to the conductor 32 beforehand, the leads 36 may be drawn out from the receiving accommodation chamber 10 and connected to the conductor 32.

The terminal block 5 for which connections have been established is pushed into the housing 6 using the cover 7, and the cover 7 is raised up to close the opening 12 at the front surface of the housing 6.

Thus, since the terminal box 1 is moved into and out from the housing 6 by moving the terminal block 5 along the rail 19, moving the terminal box 1 in and out is a simple procedure, and the terminal block can be drawn outward over a required distance depending on the surrounding area available. Moreover, since the terminal block 5 can be moved in and out using the open cover 7, the operation is simple and very safe, and thus prevents electric shock caused by a direct contact with the terminal block 5.

In addition, compared to the conventional example in which the terminal block 5 is mounted on the rear surface of the cover 7, the orientation or height of the terminal block 5 does not significantly change when the block is moved in or out. This prevents an excessive force from acting on the connected leads and further prevents the leads from being deformed or displaced. As a result, the leads are unlikely to become entangled or cause an open circuit.

Moreover, the terminal block 5 does not restrict the height of the cover 7, so the terminal box 1 can further be miniaturized.

Furthermore, even if the connection shaft 29 is damaged to release the cover 7, the terminal block 5 does not move, thereby preventing the leads 23 and 36 from being affected.

The manifold block 2 on which the terminal box 1 is mounted is joined with an adjacent manifold block via a gasket 56 that seals the periphery of the channels and is connected thereto using connection bolts 57 so that a plurality of manifold blocks can be connected together. In this case, the terminal boxes 1 are mutually joined via the seal member 20 in an airtight manner. Since the cover 7 is also mounted on the front surface of the housing 6 in an airtight manner using the seal member 41, the terminal box 1 is provided with excellent waterproofness, thereby precluding leakage and short circuits in the feeding section in cases where the terminal box is used in a poor operating environment with, for example, high humidity.

Figure 14:
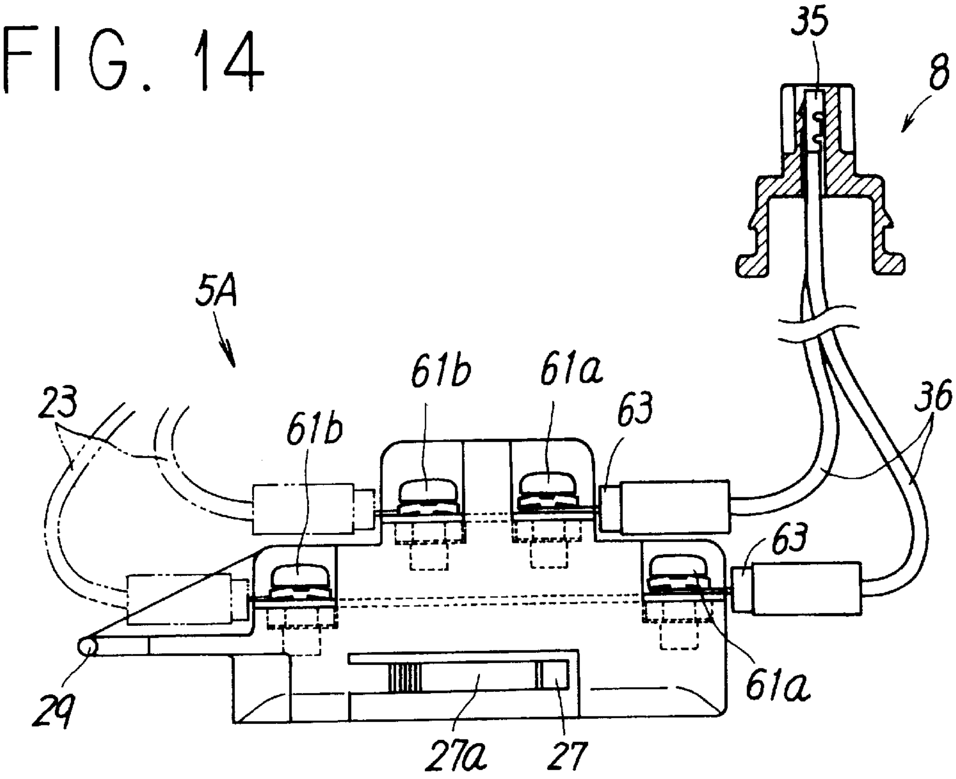
FIG. 14 is a side view showing a variation of the terminal block.
Figure 15:
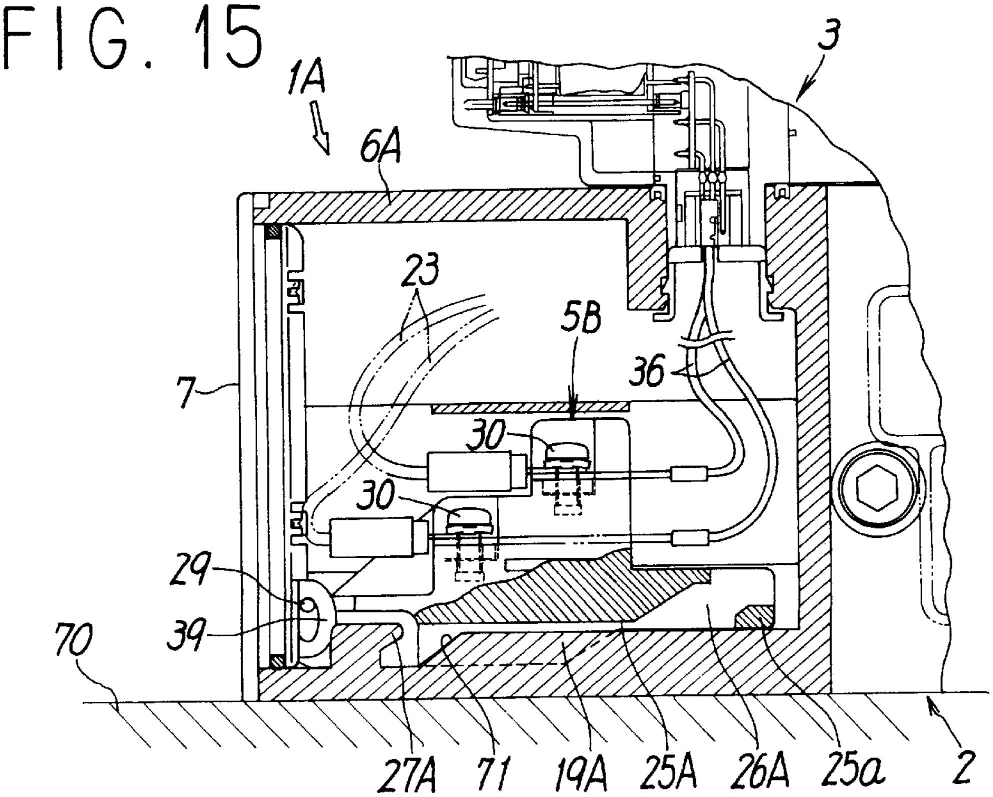
FIG. 15 is a sectional view of a terminal box according to a second embodiment of this invention mounted on a manifold block.
Figure 16:
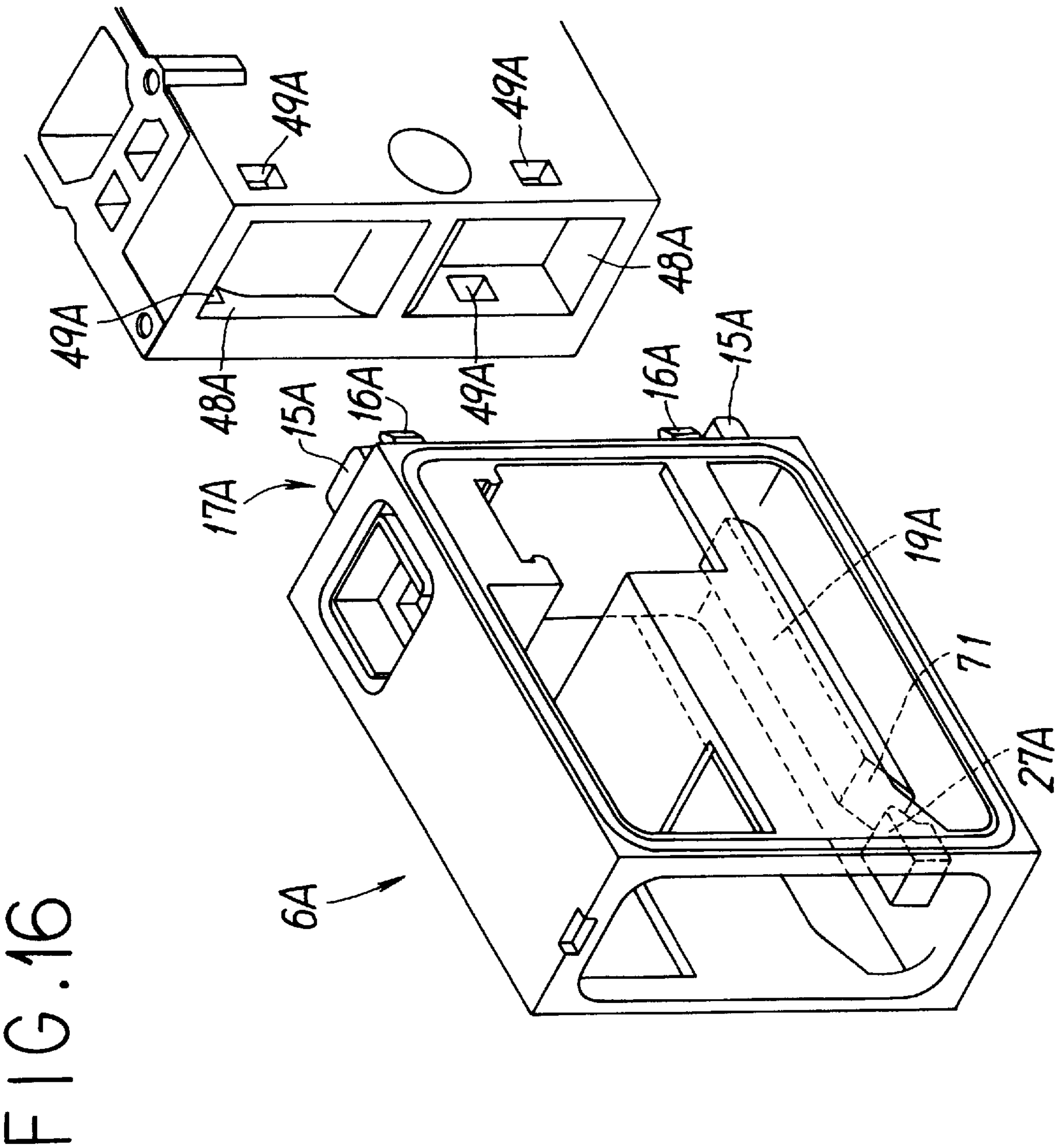
FIG. 16 is a perspective view showing a housing according to the second embodiment that has been removed from the manifold block.
Figure 17:
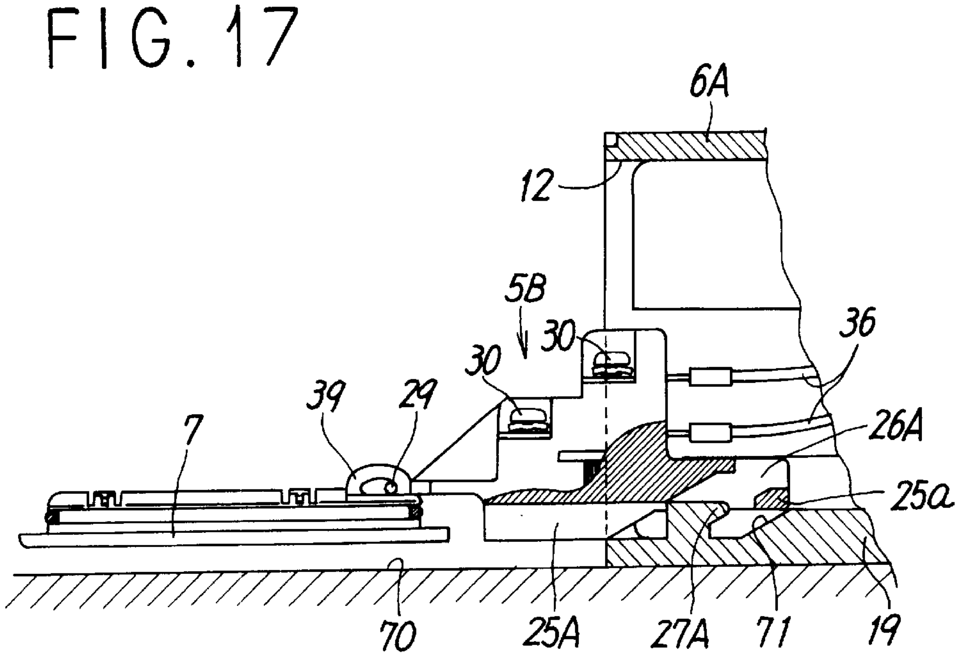
FIG. 17 is a sectional view of part of the second embodiment showing how the cover is opened and the terminal block drawn out.
Figure 18:
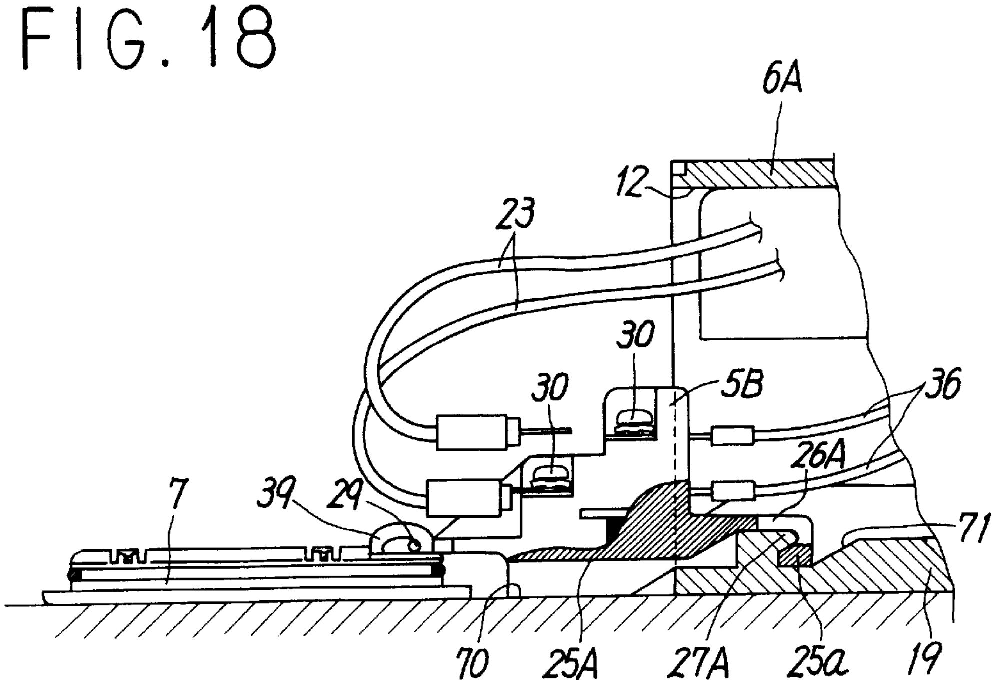
FIG. 18 is a sectional view of part of the second embodiment in which the terminal block has been drawn out as far as possible.

FIG. 14 shows a variation of the above terminal block. The terminal block 5A according to the second embodiment differs from the terminal block 5 according to the first embodiment as follows. The terminal block 5 according to the first embodiment indirectly connects the receiving leads 36 on the solenoid-operated valve 3 side of the terminals 30 via the conductor 32 while said block directly connects the feeding leads 23 on the external power source side of the terminals 30. By contrast, the terminal block 5A according to the second embodiment has plural sets of terminals, each consisting of two electrically interconnected terminals 61*a* and 61*b*. These terminals 61*a* and 61*b* are located in different vertical stages in such a way that the receiving lead 36 is connected to terminal 61*a* in each set through a crimp terminal, while the feeding lead 23 is connected to the other terminal 61*b*.

In all other respects, the terminal block 5A according to the second embodiment is substantially the same as terminal block 5 of the first embodiment, so similar significant components in the figure have the same reference numerals, and a detailed description of them is omitted.

FIGS. 15 to 18 show a second embodiment of this invention. When the terminal block 5B is drawn out from the housing 6A, a terminal box 1A according to this invention prevents the terminal block 5B from assuming an unstable position in which it is inclined with its rear end riding on the bottom surface of the housing 6A. Thus, the terminal block is stably supported by abutting substantially the overall bottom surface of the block on the manifold block installation surface 70 in such a way as to load the block thereon. This configuration enables the leads 23 to be connected more easily to the terminals 30 using a tool such as a screwdriver, and further prevents the terminal block from being damaged when a large force acts on the incompletely supported terminal block while the leads 23 are being screwed in.

Thus, according to the second embodiment, a guide mechanism is provided in the housing 6A and terminal block 5B to lower the terminal block 5B while said block is being drawn out.

The guide mechanism consists of a wall 71 which is formed at the tip of the rail 19A and inclined forward and downward. When the terminal block 5B is drawn out along the rail 19A to the maximum extent shown in FIG. 18, a portion 25*a* of the rear end of the rail groove 25A in the terminal block 5B lowers along the inclined wall 71 so that the terminal block 5B abuts the manifold block installation surface 70.

A hook 27A that is slightly higher than the rail 19A is formed at a position of the rail 19A in front of the inclined wall 71, while a dent-shaped hook receiver 26A in which the hook 27A is fitted and engagedly locked when the terminal block 5B has been lowered. The hook 27A and the hook receiver 26A constitute a stopper mechanism for defining the maximum draw-out position of the terminal block 5B. Thus, the second embodiment does not require the stopper mechanism provided in the first embodiment.

A mounting means 17A in the terminal box 1A for mounting the terminal block 1A on the manifold block 2 according to the second embodiment has a configuration different from that in the first embodiment. The mounting means 17A includes two positioning protrusions 15A that are opposed mutually in the vertical direction and that are fitted in recessed portions 48A in the end surface of the manifold block 2; and two locking claws 16A that are opposed mutually in the vertical direction and that engage engaging and locking grooves 49A formed in the inner wall of the recessed portion 48A.

The other configuration of this embodiment is substantially the same as that of the first embodiment, so common components have common reference numerals and their description is omitted.

The second embodiment may also use plural sets of terminals 61*a* and 61*b* interconnected mutually as in the terminal block 5A shown in FIG. 14.

Thus, the terminal box of this invention is moved into and out from the housing along the rail, so the move-in and -out operations can be performed simply and safely and the terminal block can be drawn out over the distance required by the surrounding area. Besides, since the terminal block can be moved in and out using the open cover, the operation is simple and very safe as it prevents electric shock caused by direct contact with the terminal block.

In addition, compared to the conventional example in which the terminal block is mounted on the rear surface of the cover, the orientation or height of the terminal block does not significantly change when the block is moved in or out. This prevents an excessive force form acting on the connected leads and further prevents the leads from being deformed or displaced. As a result, the leads are unlikely to be entangled or cause an open circuit.

Furthermore, since the cover on the front surface is mounted on the housing via the seal member and the adjacent terminal boxes can be joined together via the seal member, this terminal box is noticeably waterproof, thereby precluding leakage and short circuits in the terminal box even if it is used in a poor operating environment with, for example, a high humidity.

What is claimed is:

1. A terminal box for a manifold-mounted solenoid-operated valve comprising a terminal box body that is mounted on each of plural manifold blocks separated for each solenoid-operated valve, and a terminal block for connecting receiving leads leading to the solenoid-operated valve on said manifold block to feeding leads leading to an external power source, wherein:

said terminal box body has a box-shaped housing that is open on both lateral sides and the front surface, and a cover that can be mounted to and detached from the front surface of the housing, wherein:

said terminal block is accommodated inside said housing so as to move in the longitudinal direction along a rail and to be drawn out from the housing to a position at which at least the terminal section is exposed, and wherein:

when the lower end of said cover is rotatably connected to said terminal block using connection shafts, the cover can be opened by inclining said connection shafts outward using said connection shafts as supporting points, so that said terminal block can be moved into and out from the housing using the open cover.

2. A terminal box according to claim 1 wherein said rail is formed on the bottom surface of the housing, and wherein a rail groove in which the rail can slide freely is formed on the bottom surface of the terminal block.

3. A terminal box according to claim 1 wherein said housing and terminal block include a stopper mechanism for defining the maximum draw-out position of the terminal block, the stopper mechanism consisting of hooks and hook receivers with which the hooks are engaged.

4. A terminal box according to claim 1 wherein said hooks are formed on both sides of the terminal block while the hook receivers are formed on the inner sides of the housing.

5. A terminal box according to claim 3 wherein said hook and hook receiver are formed at the tip of said rail formed in the housing and at the rear end of a rail groove that is formed in the terminal box and in which the rail is fitted, respectively.

6. A terminal box according to claim 1 wherein said housing and terminal box have a guide mechanism for lowering the terminal block when it is drawn out so that the terminal block stably abuts the manifold block installation surface at the position where it has been drawn out from the housing.

7. A terminal box according to claim 6 wherein said guide mechanism consists of a wall that is formed at the tip of the rail and which is inclined forward and downward, said guide mechanism being configured to lower along said inclined wall when the terminal block is drawn out and forward along the rail.

8. A terminal box according to claim 1 wherein a hook is formed at the tip of said rail; wherein a dent-shaped hook receiver in which said hook is fitted and engagedly locked when the terminal block has been lowered is formed at the rear end of a portion of the terminal block that is placed on the rail; and wherein the hook and hook receiver constitute a stopper mechanism for defining the maximum draw-out position of the terminal block.

9. A terminal box according to claim 1 wherein the terminal box has a feeding connector that is connected to a receiving connector provided in said solenoid valve, and wherein said receiving leads are connected between the feeding connector and said terminal block.

10. A terminal box according to claim 1 wherein a waterproof seal member is interposed between said cover and housing, and wherein a seal member is provided on both sides of said housing to keep adjacent terminal boxes waterproof when a plurality of terminal boxes are joined together.

* * * * *